(12) United States Patent
Schwartz et al.

(10) Patent No.: US 9,772,725 B2
(45) Date of Patent: Sep. 26, 2017

(54) HYBRID SENSING TO REDUCE LATENCY

(71) Applicant: Synaptics Incorporated, San Jose, CA (US)

(72) Inventors: Adam Schwartz, Redwood City, CA (US); Joseph Kurth Reynolds, Alviso, CA (US)

(73) Assignee: Synaptics Incorporated, San Jose, CA (US)

( * ) Notice: Subject to any disclaimer, the term of this patent is extended or adjusted under 35 U.S.C. 154(b) by 186 days.

(21) Appl. No.: 14/495,679

(22) Filed: Sep. 24, 2014

(65) Prior Publication Data

US 2016/0085335 A1    Mar. 24, 2016

(51) Int. Cl.
| | |
|---|---|
| G06F 3/044 | (2006.01) |
| G06F 1/32 | (2006.01) |
| G06F 3/041 | (2006.01) |

(52) U.S. Cl.
CPC ............ *G06F 3/044* (2013.01); *G06F 1/3262* (2013.01); *G06F 3/0416* (2013.01)

(58) Field of Classification Search
CPC .. G06F 3/0412; G06F 3/0418; G01R 27/2605
See application file for complete search history.

(56) References Cited

U.S. PATENT DOCUMENTS

| | | | |
|---|---|---|---|
| 8,493,356 B2 | 7/2013 | Joharapurkar et al. | |
| 8,564,555 B2 | 10/2013 | Day et al. | |
| 8,587,555 B2 | 11/2013 | Chang et al. | |
| 8,599,167 B2 | 12/2013 | Joharapurkar et al. | |
| 8,624,860 B2 | 1/2014 | Lee et al. | |
| 8,624,866 B2 | 1/2014 | Chang | |
| 2010/0277505 A1 | 11/2010 | Ludden et al. | |
| 2011/0157077 A1* | 6/2011 | Martin | G06F 3/0418 345/174 |
| 2011/0187677 A1* | 8/2011 | Hotelling | G06F 3/0412 345/174 |
| 2011/0193809 A1 | 8/2011 | Walley et al. | |
| 2012/0113047 A1 | 5/2012 | Hanauer et al. | |
| 2012/0133614 A1 | 5/2012 | Bytheway et al. | |
| 2012/0194471 A1 | 8/2012 | Park et al. | |
| 2012/0281018 A1 | 11/2012 | Yamamoto et al. | |
| 2013/0154996 A1 | 6/2013 | Trend et al. | |

(Continued)

FOREIGN PATENT DOCUMENTS

| | | |
|---|---|---|
| TW | 201239717 A | 10/2012 |
| TW | 201303678 A | 1/2013 |

*Primary Examiner* — Kevin M Nguyen
(74) *Attorney, Agent, or Firm* — Osha Liang LLP

(57) ABSTRACT

A processing system comprises a sensor module and a determination module. The sensor module is configured to acquire changes in absolute capacitance from a first plurality of sensor electrodes of a sensor electrode pattern. The sensor module is also configured to utilize the changes in absolute capacitance to determine a drive order in which to drive sensor electrodes of the first plurality of sensor electrodes to acquire changes in transcapacitance between the first plurality of sensor electrodes and a second plurality of sensor electrodes of the sensor electrode pattern. The determination module is configured to determine positional information for an input object in a sensing region of the capacitive sensing device based on the changes in transcapacitance.

22 Claims, 12 Drawing Sheets

(56) References Cited

U.S. PATENT DOCUMENTS

| | | |
|---|---|---|
| 2013/0163496 A1 | 6/2013 | Trainin et al. |
| 2013/0176273 A1 | 7/2013 | Li et al. |
| 2013/0293507 A1 | 11/2013 | Singh et al. |
| 2013/0321001 A1 | 12/2013 | Hargreaves |
| 2013/0328826 A1 | 12/2013 | Liu et al. |
| 2014/0002114 A1 | 1/2014 | Schwartz et al. |
| 2014/0043285 A1 | 2/2014 | Tu et al. |
| 2014/0074436 A1* | 3/2014 | Voris ................. G01R 27/2605 702/194 |

\* cited by examiner

700

```
┌─────────────────────────────────────────────────────┐
│ ACQUIRE, BY A PROCESSING SYSTEM, CHANGES IN ABSOLUTE│
│ CAPACITANCE FROM A FIRST PLURALITY OF SENSOR        │
│ ELECTRODES OF A SENSOR ELECTRODE PATTERN            │
│                       710                           │
└─────────────────────────────────────────────────────┘
                          │
                          ▼
┌─────────────────────────────────────────────────────┐
│ UTILIZE, BY THE PROCESSING SYSTEM, THE CHANGES IN   │
│ ABSOLUTE CAPACITANCE TO DETERMINE A DRIVE ORDER IN  │
│ WHICH TO DRIVE SENSOR ELECTRODES OF THE FIRST       │
│ PLURALITY OF SENSOR ELECTRODES TO ACQUIRE CHANGES IN│
│ TRANSCAPACITANCE BETWEEN THE FIRST PLURALITY OF     │
│ SENSOR ELECTRODES AND A SECOND PLURALITY OF SENSOR  │
│ ELECTRODES OF THE SENSOR ELECTRODE PATTERN          │
│                       720                           │
└─────────────────────────────────────────────────────┘
                          │
                          ▼
┌─────────────────────────────────────────────────────┐
│ DETERMINE, BY THE PROCESSING SYSTEM, POSITIONAL     │
│ INFORMATION FOR AN INPUT OBJECT IN A SENSING REGION │
│ OF THE CAPACITIVE SENSING DEVICE BASED ON THE       │
│ CHANGES IN TRANSCAPACITANCE                         │
│                       730                           │
└─────────────────────────────────────────────────────┘
```

ACQUIRE CHANGES IN ABSOLUTE CAPACITANCE FROM THE SECOND PLURALITY OF SENSOR ELECTRODES
722

UTILIZE THE CHANGES IN ABSOLUTE CAPACITANCE FROM THE SECOND PLURALITY OF SENSOR ELECTRODES TO DETERMINE A SECOND DRIVE ORDER IN WHICH TO DRIVE SENSOR ELECTRODES OF THE SECOND PLURALITY OF SENSOR ELECTRODES TO ACQUIRE CHANGES IN TRANSCAPACITANCE BETWEEN THE SECOND PLURALITY OF SENSOR ELECTRODES AND THE FIRST PLURALITY OF SENSOR ELECTRODES OF THE SENSOR ELECTRODE PATTERN
724

INITIATE THE ACQUISITION OF THE CHANGES IN TRANSCAPACITANCE IN RESPONSE TO DETECTION OF THE INPUT OBJECT FROM THE CHANGES IN ABSOLUTE CAPACITANCE
727

FIG. 7C

HYBRID SENSING TO REDUCE LATENCY

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

A processing system comprises a sensor module and a determination module. The sensor module is configured to acquire changes in absolute capacitance from a first plurality of sensor electrodes of a sensor electrode pattern. The sensor module is also configured to utilize the changes in absolute capacitance to determine a drive order in which to drive sensor electrodes of the first plurality of sensor electrodes to acquire changes in transcapacitance between the first plurality of sensor electrodes and a second plurality of sensor electrodes of the sensor electrode pattern. The determination module is configured to determine positional information for an input object in a sensing region of the capacitive sensing device based on the changes in transcapacitance.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements.

FIGS. 7A-7C illustrate a flow diagram of an example method of capacitive sensing, according to various embodiments.

DESCRIPTION OF EMBODIMENTS

Figure 1:
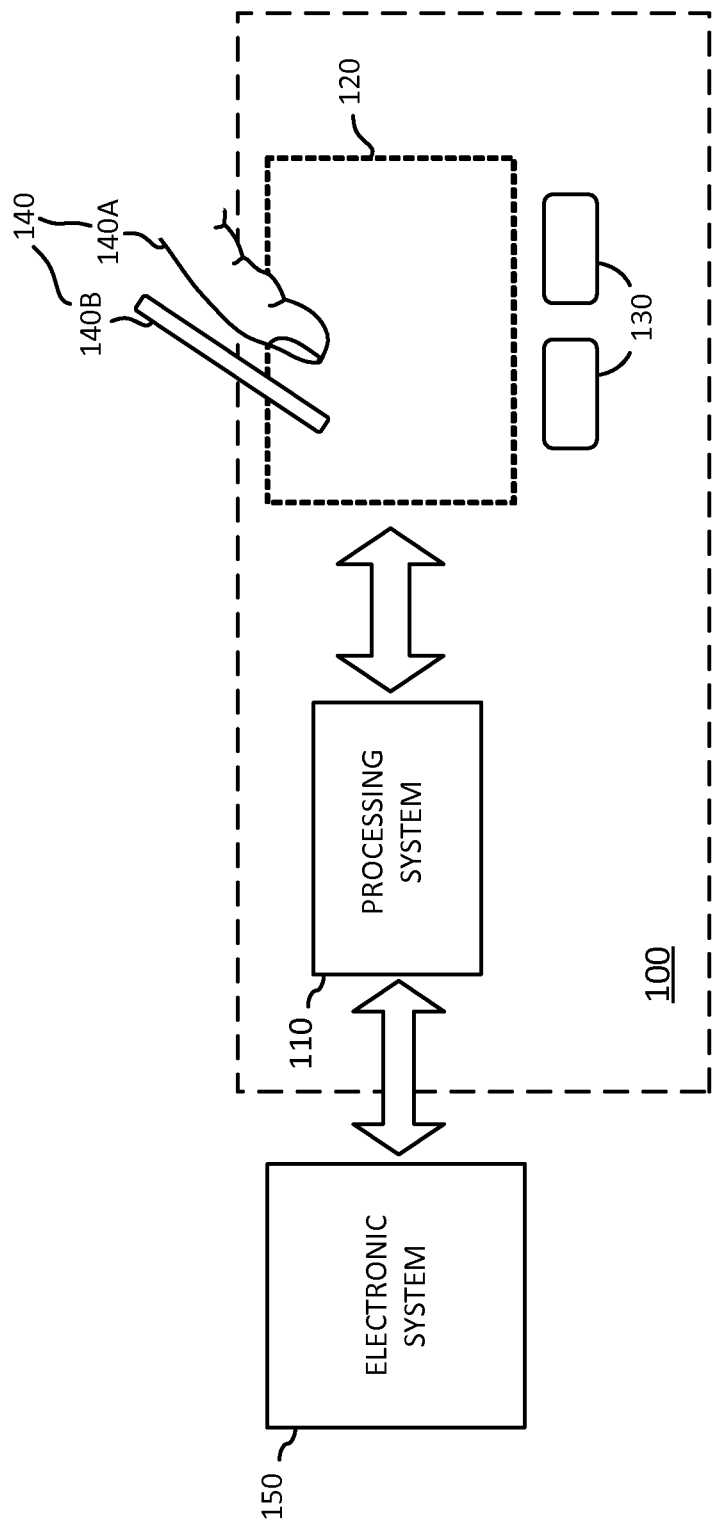
FIG. 1 is a block diagram of an example input device, in accordance with some embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device.

Various factors contribute to latency in the detection of an input object that is proximate to a sensor electrode pattern of an input device. In particular, some aspects that contribute to latency in detecting/locating a proximate input object through transcapacitive sensing can be attributed to the nature of the input object's location and/or interaction with a sensor electrode pattern. In one example, an input object may become proximate to a portion of a capacitive sensor device after that portion has been scanned to detect a transcapacitive image frame. When this occurs, the input object is not recognized as being present until a subsequent scan generates a transcapacitive image frame, thus resulting in latency. In another example, where a proximate object enters the sensing region that is being scanned during a transcapacitive image frame, the initial point at which the input object is detected may create a centroid which appears to shift during a subsequent transcapacitive image frame as the input object reaches a more stable position. This can occur because only a portion of the object (e.g., a finger) initially enters the sensing region, e.g., lands on a surface, and then more of the object lands shortly thereafter. Because of this, and to prevent a false reading of movement, an initial transcapacitive image frame showing touch or landing of an input object is often, conventionally, discarded. This discarding of the initial transcapacitive image frame results in latency of reporting a proximate input object.

Embodiments associated with hybrid sensing to reduce latency are described herein. Herein, "hybrid sensing" refers to the use of a combination of absolute capacitive sensing and transcapacitive sensing to determine the location of an input object with respect to a capacitive sensing input device (or sub-portion thereof). As will be discussed, techniques of hybrid sensing can be used to reduce latency, in comparison to use of only transcapacitive sensing. This is because, in many embodiments, an absolute capacitive sensing portion of hybrid sensing with a sensor electrode pattern can be conducted much more quickly than a solely transcapacitive image frame can be imaged with the same sensor electrode pattern. Discussion begins with a description of an example input device with which or upon which various embodiments described herein may be implemented. An example sensor electrode pattern is then described. This is followed by description of an example processing system and some components thereof. The processing system may be utilized with or as a portion of an input device, such as a capacitive sensing input device. Several example flowcharts for techniques of reducing latency with hybrid sensing are described. Several operational examples of reducing latency are then described with respect to a sensor electrode pattern and its sensing region. Operation of the input devices, processing systems, and components thereof are then further described in conjunction with description of an example method of capacitive sensing.

Example Input Device

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers (140A) and styli (140B), as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected on to an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s)

corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

Some capacitive implementations utilize "hybrid capacitance" sensing methods and techniques which are based on utilizing a combination of absolute capacitive sensing and transcapacitive sensing to ascertain information about one or more input object interacting with a sensing region 120 of an input device 100.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Example modules can also include sensor modules configured to operate sensing element(s) to detect input, determination modules configured to determine absolute capacitance and positions of any inputs objects therefrom, determination modules configured to determine changes in transcapacitance and positions of any input objects therefrom, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
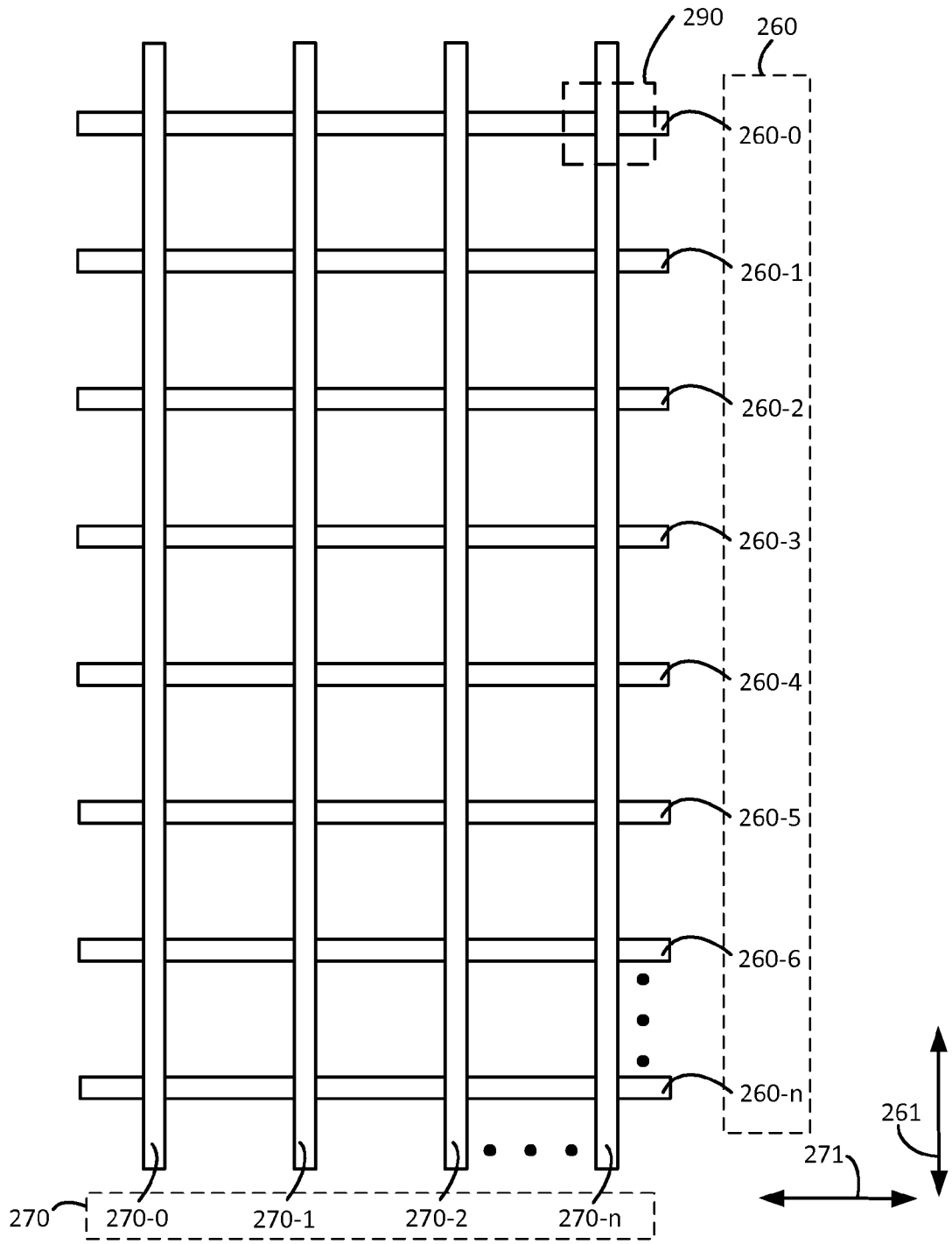
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is to be appreciated that numerous other sensor electrode patterns may be employed with the techniques described herein, including but not limited to: patterns with a single sensor electrode, patterns with a single set of sensor electrodes, patterns with two sets of sensor electrodes disposed in a single layer (without overlapping), patterns that utilize a common voltage ($V_{COM}$) of a display device to perform some aspects of capacitive sensing, and patterns that provide individual button electrodes. The illustrated sensor electrode pattern is made up of a plurality of receiver electrodes 270 (270-0, 270-1, 270-2 . . . 270-n) and a plurality of transmitter electrodes 260 (260-0, 260-1, 260-2, 260-3, 260-4, 260-5, 260-6 . . . 260-n) which overlay one another, in this example. In the illustrated example, sensor electrodes 260 are arrayed along a first axis 261 while sensor electrodes 270 are arrayed along a second axis 271. Axes 261 and 271 are illustrated as being orthogonal with respect to one another. In the illustrated example, touch sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. In such an embodiment, a transcapacitive image frame would be acquired after all of the sensor electrodes 260 had been driven in the described matter so that resulting signals could be received on sensor electrodes 270.

It should be appreciated that in some embodiments, the roles of transmitter and receiver may be reversed and that, in a similar manner as just described, sensor electrodes 270 may be driven to transmit a transmitter signal, while sensor electrodes 260 are used to receive resulting signals in order to capture another capacitive image. In such an embodiment, a transcapacitive image frame would be acquired after all of the sensor electrodes 270 had been driven in the described matter so that resulting signals could be received on sensor electrodes 260.

In some embodiments, one or more sensor electrodes 260 or 270 may be operated to perform absolute capacitive sensing at a particular instance of time. For example, receiver electrode 270-0 may be charged and then the capacitance of receiver electrode 270-0 may be measured. In such an embodiment, an input object 140 interacting with receiver electrode 270-0 alters the electric field near receiver electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode."

Example Processing System

Figure 3:
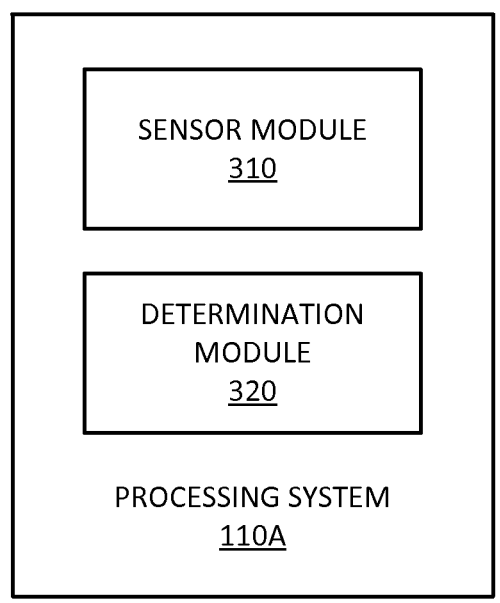
FIG. 3 shows a block diagram of an example processing system, according to an embodiment.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100, of which it is a part, may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

Sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for receiving, be used for transcapacitive sensing, and/or to be used for absolute capacitive sensing. This also includes operating a second plurality of sensor electrodes (e.g., sensor electrodes 270) to be silent, to be driven with a transmitter signal, to be used for receiving, to be used for transcapacitive sensing, to be used for absolute capacitive sensing, and/or to be used for hybrid capacitive sensing.

In absolute capacitive sensing, a sensor electrode is both driven and used to receive a resulting signal that results from the signal driven on to the sensor electrode. In this manner, during absolute capacitive sensing, sensor module 310 operates to drive a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In one embodiment, sensor module 310 operates sensor electrodes of a sensor electrode pattern to perform profile sensing on one or more axes. For example, with respect to sensor electrode pattern 200, sensor module 310 operates to drive on and receive from each of the sensor electrodes 260 that are arrayed along axis 261. Sensor module 310 may simultaneously drive all of sensor electrodes 260 and then receive on all of sensor electrodes 260 in order to acquire changes in absolute capacitance which will form an absolute capacitive profile along axis 261 from which determination module 320 can determine the presence of absence of an input object 140. Any number of sensor electrodes 260 may be driven simultaneously in order to acquire changes in absolute capacitance on a subset of sensor electrodes. Subsequent to a first subset of sensor electrodes 260 being driven, a second subset of sensor electrodes 260 may be driven to acquire changes in absolute capacitance. The changes in absolute capacitance of the first and second subset of sensor electrodes may be combined when generating a capacitive image profile.

With respect to sensor electrode pattern 200, sensor module 310 may additionally or alternatively operate to drive on and receive from each of the sensor electrodes 270 that are arrayed along axis 271. Sensor module 310 may simultaneously drive all of sensor electrodes 270 and then receive on all of sensor electrodes 270 in order to acquire changes in absolute capacitance which will form an absolute capacitive profile along axis 271 from which determination module 320 can determine the presence of absence of an input object 140. Any number of sensor electrodes 270 may be driven simultaneously in order to acquire changes in absolute capacitance on a subset of sensor electrodes. Subsequent to a first subset of sensor electrodes 270 being driven, a second subset of sensor electrodes 270 may be driven to acquire changes in absolute capacitance. The changes in absolute capacitance of the first and second subset of sensor electrodes may be combined when generating a capacitive image profile. The changes in absolute capacitance, as determined by determination module 320 from one or both of these absolute capacitive profiles may then be used by determination module 320 to determine a general location at which an input object is interacting with the sensor electrode pattern (e.g., sensor electrode pattern 200). Based on this location, sensor module 310 can determine a drive order and/or drive start location to drive sensor electrodes 260 to acquire changes in transcapacitance between sensor electrodes 260 and sensor electrodes 270 of sensor electrode pattern 200. In one embodiment, the drive order and/or drive start location is started away from the location determined by determination module 320. This allows time for the input object interaction to further develop before the location is transcapacitively imaged.

During transcapacitive sensing, sensor module 310 operates to drive transmitter signals on one or more sensor electrodes of a first plurality of sensor electrodes (e.g., one or more of transmitter electrodes 260). As discussed above, the drive order in which sensor electrodes are driven for transcapacitive sensing may be determined based on previously performed absolute capacitive sensing. Moreover, in some embodiments, transcapacitive sensing is only initiated in response to detection of an input object based on previously performed absolute capacitive sensing. Further, sensor module 310 may delay the initiation of transcapacitive sensing for a determined period of time after detection of an input object via absolute capacitive sensing. As will be further discussed below, the determined period of time is less than the time that it would take for the acquisition of a transcapacitive image frame. In some embodiments, sensor module 310 selects a drive order of electrodes during transcapacitive sensing and/or inserts a delay prior to the start of transcapacitive sensing in order to let an input object interaction (e.g., a touch by a finger) further develop before the portion of the sensor electrode pattern with which the input object is interacting is scanned as part of a transcapacitive image frame. Such actions prevent the need for disposing of a transcapacitive imaging frame that is generated from transcapacitive sensing prior to the input object interacting to a sufficient degree, and thus introducing latency. Such actions also prevent the latency that can occur if an input object begins to interact with a portion of a sensor electrode arrangement during transcapacitive sensing after that portion has been scanned during a transcapacitive image frame, but before the acquisition of the transcapacitive image frame is complete. For example, if an input object is expected to be currently interacting with a first portion of the sensor electrode arrangement, it some situations it is beneficial to begin transcapacitive sensing for an image frame in a second portion of the sensor electrode arrangement. This allows the input object to more fully interact with the sensor electrode before the first portion of the sensor electrode arrangement is scanned which can result in a more accurate transcapacitive image frame.

During transcapacitive sensing, a transmitter signal may be a square wave, trapezoidal wave, or some other waveform. In a given time interval, sensor module 310 may drive or not drive a transmitter signal (waveform) on one or more of the first plurality of sensor electrodes (e.g., sensor electrodes 260). Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signals may be coded according to a code. The code may be altered, such as lengthening or shortening the code. Sensor module 310 operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions.

In some embodiments of transcapacitive sensing, sensor module 310 may drive transmitter signals on one or more of the second plurality of sensor electrodes (e.g., sensor electrodes 270) while using the first plurality of sensor electrodes (e.g., sensor electrodes 260) for receiving resulting signals. Transcapacitive sensing accomplished by driving on sensor electrodes 270 and receiving on sensor electrodes 260 may be accomplished in addition to or in alternative transcapacitive sensing accomplished by driving on sensor electrodes 260 and receiving on sensor electrodes 270. As discussed above, the drive order in which sensor electrodes are driven for transcapacitive sensing may be determined based on previously performed absolute capacitive sensing. Drive order can determine not only where in a sensor electrode arrangement a transcapacitive scanning begins, but also in which order the scanning is performed. For example, in the example embodiment of FIG. 2, transcapacitive scanning may proceed sequentially from sensor electrode 260-0 to 260-n based on the determined drive order. In subsequent transcapacitive scans, or in other embodiments, transcapacitive scanning may proceed sequentially from sensor electrode 260-n to 260-0. Additionally, various non-sequential transcapacitive scanning methods may be dictated by the drive order. Moreover, in some embodiments, transcapacitive sensing is initiated in response to detection of an input object based on previously performed absolute capacitive sensing.

Sensor module 310 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Determination module 320 may be implemented as hardware (e.g., hardware logic and/or other circuitry) and/or as a combination of hardware and instructions stored in a non-transitory manner in a computer readable storage medium.

In embodiments where absolute capacitive sensing is performed with sensor electrodes 260 and/or 270, determination module 320 operates to compute/determine a measurement of absolute capacitive coupling (also referred to as background capacitance, $C_B$) to a sensor electrode. With respect to the techniques described herein, determination module 320 operates to determine an absolute capacitance of a sensor electrode (e.g., sensor electrode 270-0) after a sensing signal has been driven on the sensor electrode. Determination module 320 operates to analyze profiles along one or more axes of a sensor electrode pattern, and to determine from this analysis whether an input object 140 is present or not present, and if present where it is located with respect to the axes on which the profiles were obtained. Determination module 320 also operates to distinguish whether an input that is received is consistent with an input expected from an input object 140, or should be rejected as being inconsistent with what is expected an input object 140. For example, noise and/or input received from a palm, face, thigh or other large input may be rejected as being inconsistent with and thus not being a valid input object 140.

In embodiments where transcapacitive sensing is performed, determination module 320 operates to compute/determine a measurement of a change in a transcapacitive capacitive coupling between a first and second sensor electrode during transcapacitive sensing. Determination module 320 then uses such measurements to determine the positional information comprising the position of an input object (if any) with respect to sensing region 120. The positional information can be determined from a capacitive image. The capacitive is determined by determination module 320 based upon resulting signals acquired by sensor module 310. It is appreciated that determination module 320 operates to decode and reassemble coded resulting signals to construct a capacitive image from a transcapacitive scan of a plurality of sensor electrodes. Determination module 320 also operates to combine information from absolute capacitive sensing and transcapacitive sensing to achieve hybrid capacitive sensing results, which may comprise a capacitive image.

In some embodiments, processing system 110A comprises decision making logic which directs one or more portions of processing system 110A, such as sensor module 310 and/or determination module 320, to operate in a selected one of a plurality of different operating modes based on various inputs. For example, in some embodiments, processing system 110A may enter a low power sleep mode based absolute capacitive sensing operations failing to detect an input object 140 in a sensing region 120. The sleep mode can take many forms. In embodiment, the sleep mode comprises processing system 110A saving power by suspending capacitive sensing operations for a predetermined period of time and then resuming capacitive sensing operations after the predetermined period of time has passed.

In various embodiments, processing system 110A operates sensor electrodes of a sensor electrode pattern, such as sensor electrode pattern 200, according to one or more of the flowcharts illustrated in FIGS. 4A, 4B, 4C, 4D, 5A, and 5B. The operation may follow one or more of these flowcharts in whole or in part. Further, it should be appreciated that these flowcharts are simplified and the additional operational detail may be implemented in some embodiments.

Example Flowcharts

Hybrid sensing is a combination of absolute capacitive sensing and transcapacitive sensing to detect and locate an input object. Hybrid sensing can be used to reduce latency, in comparison to use of only transcapacitive sensing. This is because, in many embodiments, absolute capacitive sensing with a sensor electrode pattern can be conducted much more quickly than a transcapacitive image frame can be imaged with a sensor electrode pattern. In this manner, the faster absolute capacitive sensing can be utilized to trigger/direct the use of the slower transcapacitive sensing, to assist in determining the drive order for driving sensor electrodes to obtain a transcapacitive image frame, to determine which sensor electrodes to drive during transcapacitive sensing, and/or to determine the timing of when to begin driving sensor electrodes to obtain a transcapacitive image frame.

Figure 4A:
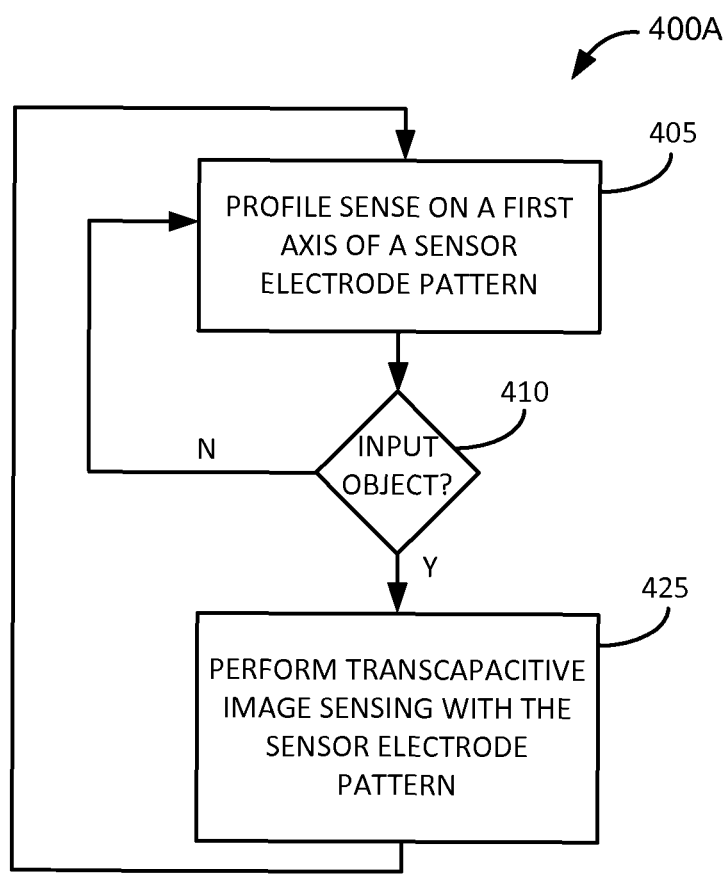
FIG. 4A illustrates a flowchart of a method of using hybrid sensing to reduce latency according to an embodiment.

FIG. 4A illustrates a flowchart 400A of a method of using hybrid sensing to reduce latency according to an embodiment.

At 405, profile sensing is performed on a first axis of a capacitive sensor device. For example, sensor module 310 is configured to use, and directs use of, a first plurality of sensor electrodes (e.g., sensor electrodes 260 of sensor electrode pattern 200) to perform profile sensing and to obtain an absolute capacitive profile along an axis of the sensor electrode pattern (e.g., axis 261). In some embodiments, sensor electrodes 260 are also used as transmitter electrodes for transcapacitive sensing, and a transcapacitive image frame is scanned by driving transmitter signals on sensor electrodes 260 that are arrayed along axis 261 and receiving with sensor electrodes 270 that are arrayed along axis 271.

At 410, it is determined whether an input object is present in the absolute capacitive profile that is obtained in 405. For example, determination module 320 is configured to determine, and is used to determine, if any input has been detected and if so whether the input that is detected in the absolute capacitive profile corresponds with what would expected from an input object 140, rather than from some other non-input object such as a face, palm, thigh, or the like. If a valid input object 140 is not detected, the method returns to and repeats 405. If a valid input object 140 is detected, the method proceeds to 425.

At 425, transcapacitive image sensing is performed with the capacitive sensor electrodes. For example, sensor module 310 selectively drives transmitter signals on sensor electrodes 260 and receives resulting signals on sensor electrodes 270 in order to capture a transcapacitive image frame. As will be described further below, information from the absolute capacitive profiles may be utilized to guide the drive order and/or timing of driving the sensor electrodes during the transcapacitive sensing of a transcapacitive image frame. Transcapacitive sensing can be used to capture a plurality of transcapacitive image frames, and in one embodiment ceases when determination module 320 determines that an input object is not present in a transcapacitive image frame. When an input object is not present, the method proceeds back to 405 and starts again.

In the manner of hybrid sensing described in flowchart 400A, transcapacitive sensing is not initiated until after a valid input object has been identified as being present by the faster techniques of absolute capacitive sensing. This leads to a reduction in sensing latency over performing transcapacitive sensing alone.

Figure 4B:
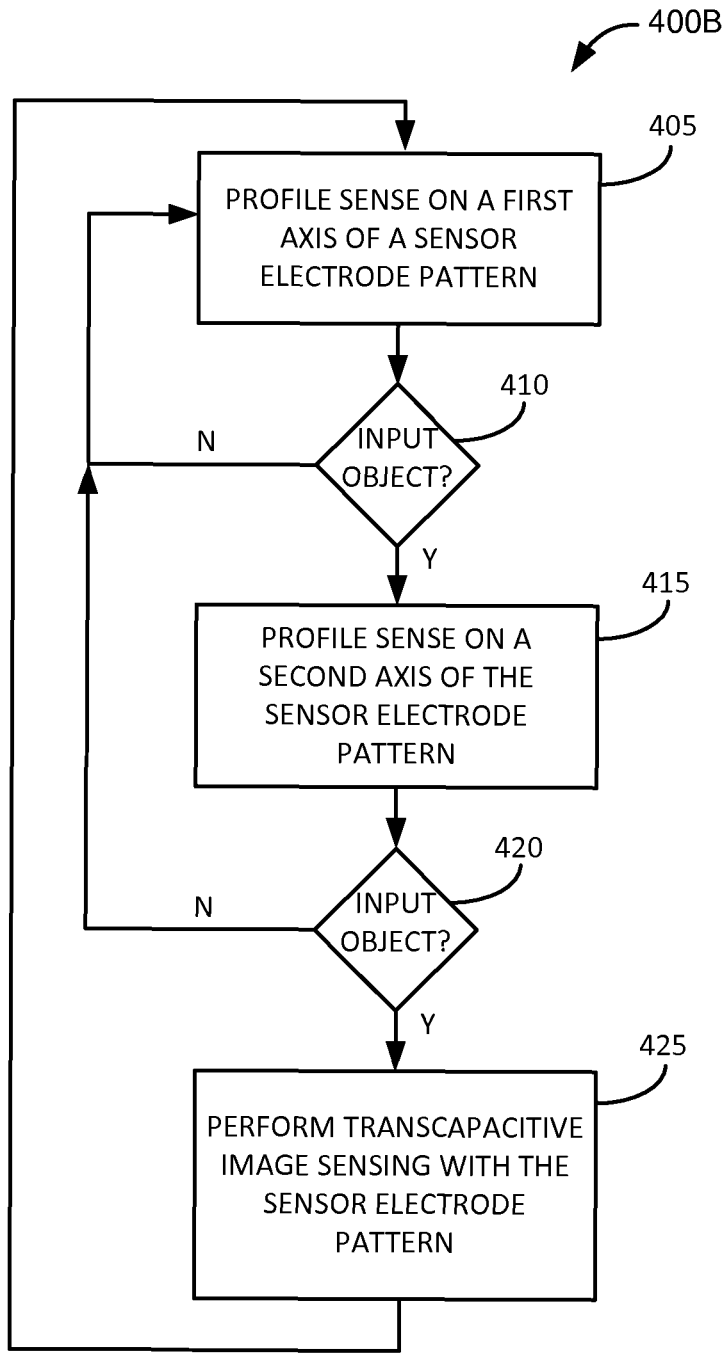
FIG. 4B illustrates a flowchart of a method of using hybrid sensing to reduce latency according to an embodiment.

FIG. 4B illustrates a flowchart 400B of a method of using hybrid sensing to reduce latency according to an embodiment. Flowchart 400B is a slight expansion of flowchart 400A, and includes absolute capacitive sensing on a second axis of the sensor electrode pattern.

At 405, profile sensing is performed on a first axis of a capacitive sensor device. For example, sensor module 310 is configured to use, and directs use of, a first plurality of sensor electrodes (e.g., sensor electrodes 260 of sensor electrode pattern 200) to perform profile sensing and to obtain an absolute capacitive profile along an axis of the sensor electrode pattern (e.g., axis 261). In some embodiments, sensor electrodes 260 are also used as transmitter electrodes for transcapacitive sensing, and a transcapacitive frame is scanned by driving transmitter signals on sensor electrodes 260 that are arrayed along axis 261 and receiving with sensor electrodes 270 that are arrayed along axis 271.

At 410, it is determined whether an input object is present in the absolute capacitive profile that is obtained in 405. For example, determination module 320 is configured to determine, and used for determining, if any input has been detected, and if so whether the input that is detected in the absolute capacitive profile corresponds with what would expected from an input object 140, rather than from some other non-input object such as a face, palm, thigh, or the like. This can include determining where an input object is located along axis 261 with respect to sensor electrode pattern 200. If a valid input object is not detected, the method returns to and repeats 405. If a valid input object 140 is detected, the method proceeds to 415.

At 415, profile sensing is performed on a second axis of a capacitive sensor device, where the second axis is oriented orthogonally to the first axis. For example, sensor module 310 is configured to use, and directs use of, a second plurality of sensor electrodes (e.g., sensor electrodes 270) to perform profile sensing and to obtain a second absolute capacitive profile along a second axis of the sensor electrode pattern (e.g., axis 271). In some embodiments, sensor electrodes 270 are also used as receiver electrodes for transcapacitive sensing, and a transcapacitive image frame is scanned by driving transmitter signals on sensor electrodes 260 that are arrayed along axis 261 and receiving with sensor electrodes 270 that are arrayed along axis 271.

At 420, it is determined whether an input object is present in the second absolute capacitive profile that is obtained in 415. For example, determination module 320 is configured to determine, and used for determining, if any input has been detected, and if so whether the input that is detected in the second absolute capacitive profile corresponds with what would expected from an input object 140, rather than from some other non-input object such as a face, palm, thigh, or the like. This can include determination module 320 comparing the first and second capacitive profiles to determine if an input object is detected and where the input object is located with respect axes 261 and 271 of sensor electrode pattern 200. If an input object is not detected, the method returns to and repeats 405. If an input object is detected, the method proceeds to 425.

It should be appreciated that the order of obtaining absolute capacitive profiles can be reversed, in some embodiments, such that a profile along axis 271 is obtained prior to obtaining a profile along axis 261.

At 425, transcapacitive image sensing is performed with the capacitive sensor electrodes. For example, sensor module 310 selectively drives transmitter signals on sensor electrodes 260 and receives resulting signals on sensor electrodes 270 in order to capture a transcapacitive image frame. As will be described further below, information from the absolute capacitive profiles may be utilized to guide the drive order and/or timing of driving the sensor electrodes during the transcapacitive sensing of a transcapacitive image frame. Transcapacitive sensing can be used to capture a plurality of transcapacitive image frames, and in one embodiment ceases when determination module 320 determines that an input object is not present in a transcapacitive image frame. When an input object is not present, the method proceeds back to 405 and starts again.

In the manner of hybrid sensing described in flowchart 400B, transcapacitive sensing is not initiated until after a valid input object has been identified as being present by the faster techniques of absolute capacitive sensing. This leads to a reduction in sensing latency over performing transcapacitive sensing alone.

Figure 4C:
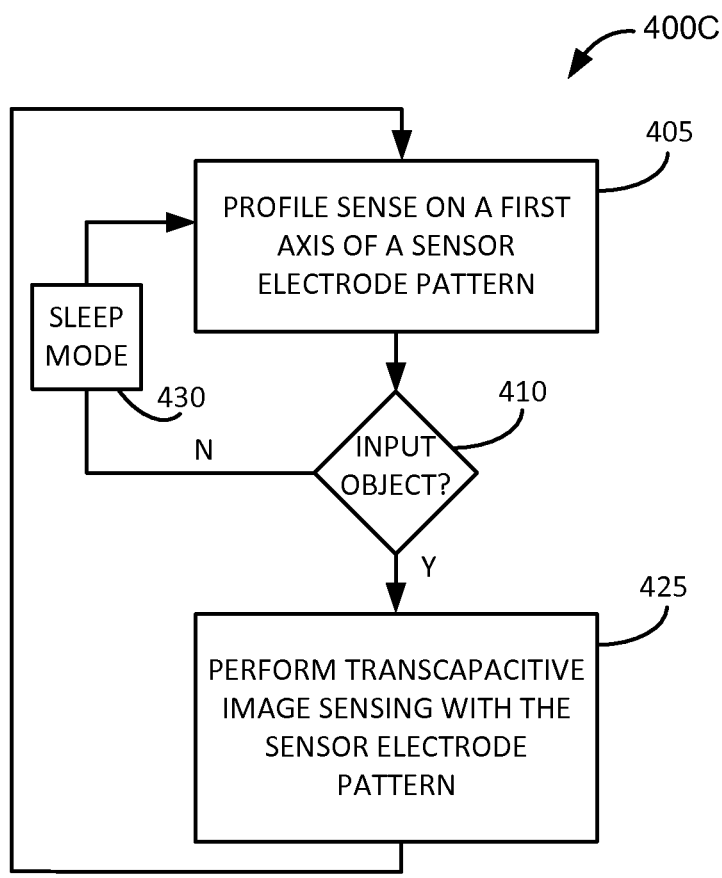
FIG. 4C illustrates a flowchart of a method of using hybrid sensing to reduce latency according to an embodiment.

FIG. 4C illustrates a flowchart 400C of a method of using hybrid sensing to reduce latency according to an embodiment. FIG. 4C is similar to FIG. 4A except that it includes a sleep mode 430 which is entered in response to no valid input object 140 being detected at 410 from the results of the absolute capacitive sensing performed in 405. Sleep mode 430 saves power by, for example, introducing a longer delay before repeating the absolute capacitive sensing of 405 than would have existed in FIG. 4A. During this delay, no capacitive sensing occurs, and thus power is saved. For example, a delay of a several milliseconds up to several seconds may be introduced by sleep mode 430. In one embodiment, for example, if processing system 110A takes 1 ms to acquire a capacitive profile and determine that there is no input/no valid input object 140 present, sleep mode 430 may be entered for a predetermined 9 ms before absolute capacitive sensing 405 is repeated. It is appreciated that processing system 110A may introduce this delay in which no capacitive sensing occurs. In some embodiments, in response to entering sleep mode 430, processing system 110A may further send a sleep notification to input device 100 and/or to electronic device 150. Such a sleep notification may be in the form of an interrupt and may direct or induce entry into a low power sleep mode of an input device 100 or electronic system 150 of which processing system 110A is a part.

In the manner of hybrid sensing described in flowchart 400C, transcapacitive sensing is not initiated until after a valid input object has been identified as being present by the much faster techniques of absolute capacitive sensing. This leads to a reduction in sensing latency over performing transcapacitive sensing alone.

Figure 4D:
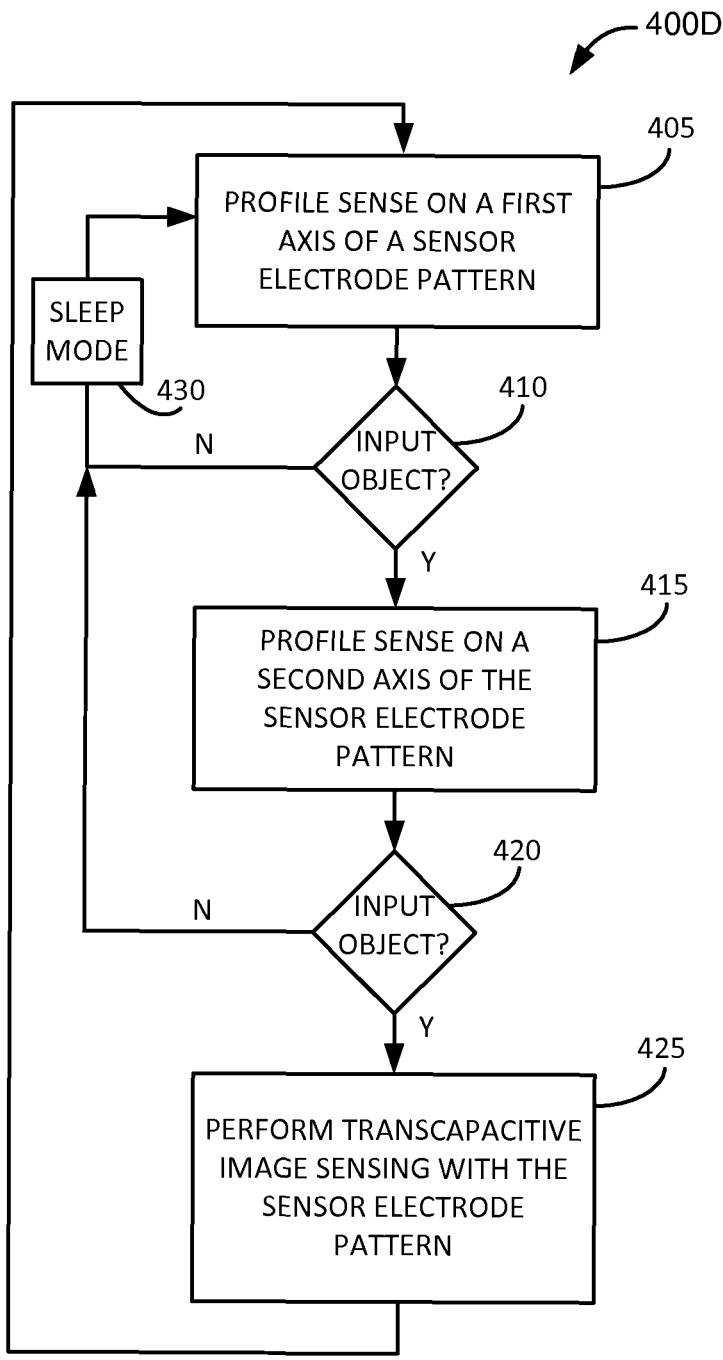
FIG. 4D illustrates a flowchart of a method of using hybrid sensing to reduce latency according to an embodiment.

FIG. 4D illustrates a flowchart 400D of a method of using hybrid sensing to reduce latency according to an embodiment. FIG. 4D is similar to FIG. 4B except that it includes a sleep mode 430 which is entered in response to no valid input object being detected: at 410 from the results of the absolute capacitive sensing performed in 405; or at 420 from the results of the absolute capacitive sensing performed in 415. Sleep mode 430 saves power by, for example, introducing a longer delay before repeating the absolute capacitive sensing of 405 than would have existed in FIG. 4B. During this delay, no capacitive sensing occurs, and thus power is saved. For example, a delay of a several milliseconds up to several seconds may be introduced by sleep mode 430. In one embodiment, for example, if processing system 110A takes 1 ms to acquire a capacitive profile and determine that there is no input/no valid input object 140 present, sleep mode 430 may be entered for a predetermined 9 ms before absolute capacitive sensing 405 is repeated. It is appreciated that processing system 110A may introduce this delay in which no capacitive sensing occurs. In some embodiments, in response to entering sleep mode 430, processing system 110A may further send a sleep notification to input device 100 and/or to electronic device 150. Such a sleep notification may be in the form of an interrupt and may direct or induce entry into a low power sleep mode of an input device 100 or electronic system 150 of which processing system 110A is a part.

In the manner of hybrid sensing described in flowchart 400D, transcapacitive sensing is not initiated until after a valid input object has been identified as being present by the much faster techniques of absolute capacitive sensing. This leads to a reduction in sensing latency over performing transcapacitive sensing alone.

Figure 5A:
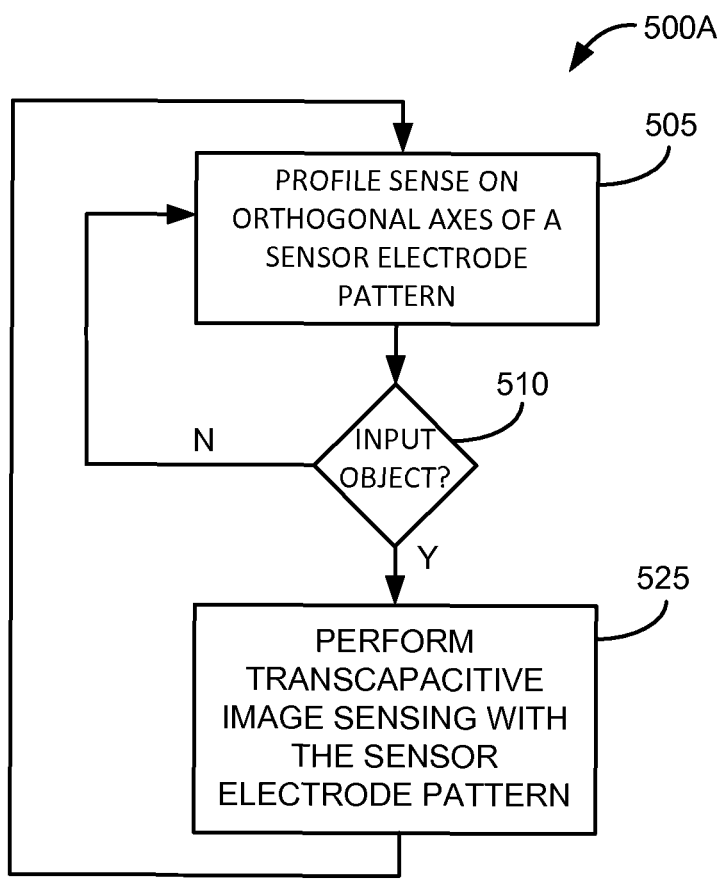
FIG. 5A illustrates a flowchart of a method of using hybrid sensing to reduce latency according to an embodiment.

FIG. 5A illustrates a flowchart 500A of a method of using hybrid sensing to reduce latency according to an embodiment.

At 505, profile sensing is performed on orthogonal axes of a capacitive sensor device. For example, sensor module 310 is configured to use, and directs use of, a first plurality of sensor electrodes (e.g., 260 of sensor electrode pattern 200) to perform profile sensing and to obtain an absolute capacitive profile along a first axis (e.g., axis 261). Sensor module 310 is also configured use, and directs use of, a first plurality of sensor electrodes (e.g., 270 of sensor electrode pattern 200) to perform profile sensing and to obtain an absolute capacitive profile along a second axis (e.g., axis 271). It should be appreciated that the order of obtaining absolute capacitive profiles can be reversed, in some embodiments, such that a profile along axis 271 is obtained prior to obtaining a profile along axis 261.

At 510, it is determined whether an input object is present in the absolute capacitive profiles that are obtained in 505. For example, determination module 320 is configured to determine, and is used for determining, if any input has been detected, and if so whether the input that is detected in the absolute capacitive profiles corresponds with what would expected from an input object 140, rather than from some other non-input object such as a face, palm, thigh, or the like. This can include determining where an input object is located along axes 261 and 271 with respect to sensor electrode pattern 200. If an input object is not detected, the method returns to and repeats 505. If an input object is detected, the method proceeds to 525.

At 525, transcapacitive image sensing is performed with the capacitive sensor electrodes. For example, sensor module 310 selectively drives transmitter signals on sensor electrodes 260 and receives resulting signals on sensor electrodes 270 in order to capture a transcapacitive image frame. As will be described further below, information from the absolute capacitive profiles may be utilized to guide the drive order and/or timing of driving the sensor electrodes during the transcapacitive sensing of a transcapacitive image frame. Transcapacitive sensing can be used to capture a plurality of transcapacitive image frames, and in one embodiment ceases when determination module 320 determines that an input object is not present in a transcapacitive image frame. When an input object is not present, the method proceeds back to 405 and starts again.

Figure 5B:
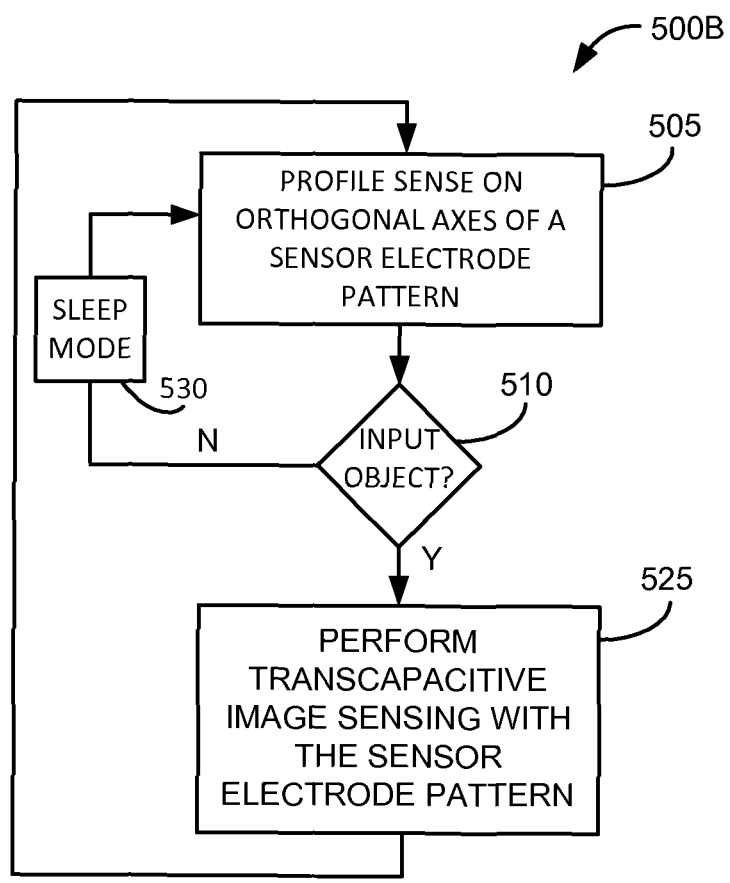
FIG. 5B illustrates a flowchart of a method of using hybrid sensing to reduce latency according to an embodiment.

FIG. 5B illustrates a flowchart of a method of using hybrid sensing to reduce latency according to an embodiment. FIG. 5B is similar to FIG. 5A except that it includes a sleep mode 530 which is entered in response to no valid input object being detected at 510 from the results of the absolute capacitive sensing performed in 505. Sleep mode 530 saves power by, for example, introducing a longer delay before repeating the absolute capacitive sensing of 505 than would have existed in FIG. 5A. During this delay, no capacitive sensing occurs, and thus power is saved. For example, a delay of a several milliseconds up to several seconds may be introduced by sleep mode 530. In one embodiment, for example, if processing system 110A takes 2 ms to acquire X and Y capacitive profiles and determine that there is no input/no valid input object 140 present, sleep mode 530 may be entered for a predetermined 8 ms before absolute capacitive sensing 505 is repeated. It is appreciated that processing system 110A may introduce this delay in which no capacitive sensing occurs. In some embodiments, in response to entering sleep mode 530, processing system 110A may further send a sleep notification to input device 100 and/or to electronic device 150. Such a sleep notification may be in the form of an interrupt and may direct or induce entry into a low power sleep mode of an input device 100 or electronic system 150 of which processing system 110A is a part.

In the manner of hybrid sensing described in flowcharts 500A and 500B, transcapacitive sensing is not initiated until after a valid input object has been identified as being present by the much faster techniques of absolute capacitive sensing. This leads to a reduction in sensing latency over performing transcapacitive sensing alone.

Operational Examples of Latency Reduction

Figure 6:
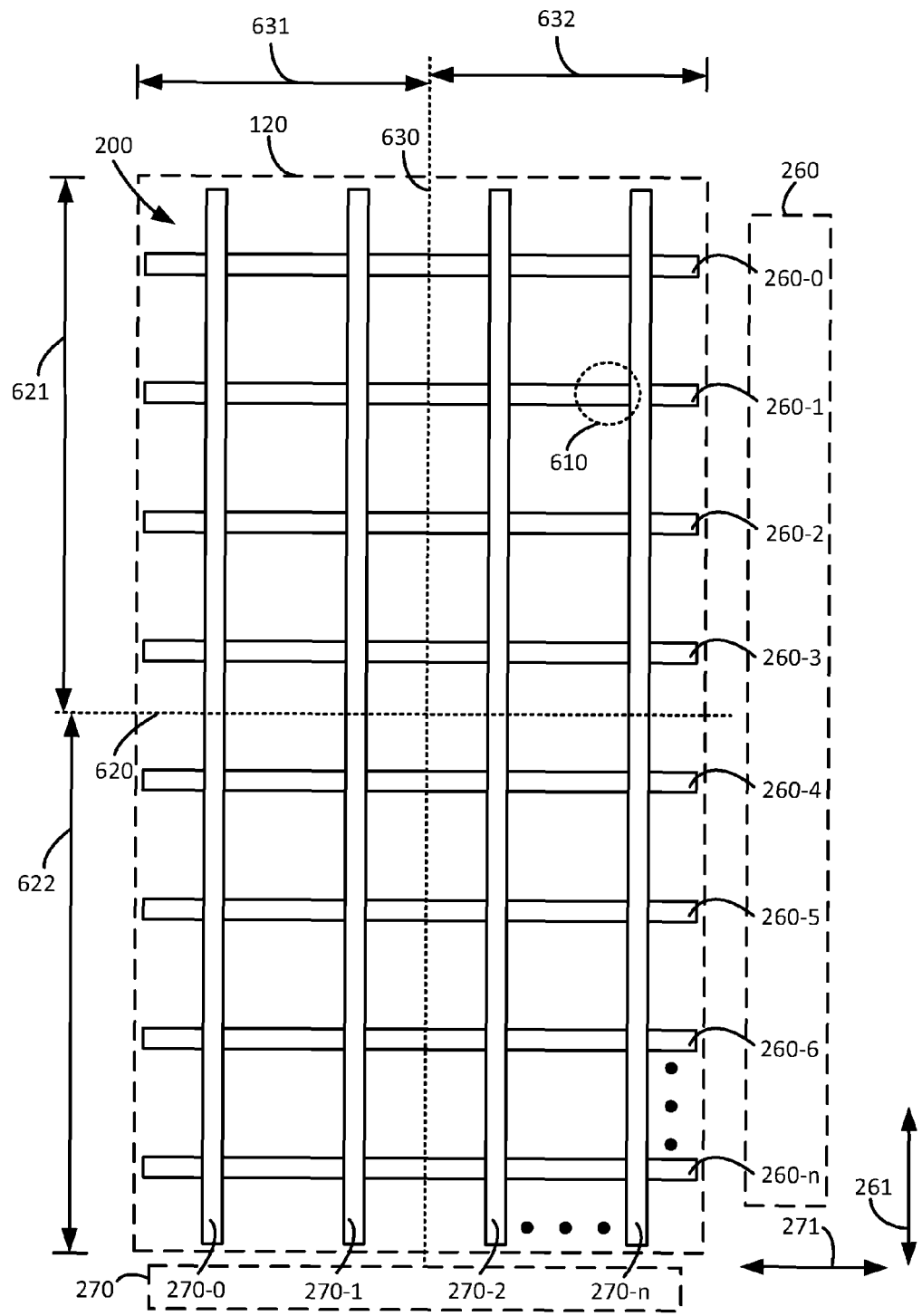
FIG. 6 illustrates an operational example of latency reduction, according to various embodiments.

FIG. 6 illustrates an operational example of latency reduction, according to an embodiment. Sensor electrode pattern 200 and its associated sensing region 120 are illustrated. For purposes of illustration, a dotted line 620 has been added to divide the sensing region 120 generated by sensor electrode pattern 200 into a first portion 621 and a second portion 622. Sensor electrodes 260-0 through 260-3 are in first portion 621, while sensor electrodes 260-4 through 260-n are in second portion 622. For purposes of illustration, a dotted line 630 has been added to divide the sensing region generated by sensor electrode pattern 200 into a third portion 631 and a fourth portion 632. Sensor electrodes 270-0 through 270-1 are in third portion 631, while sensor electrodes 270-2 through 270-n are in fourth portion 632.

After absolute capacitive profile sensing has been used (according to the method of one of flowcharts 400A, 400B, 400C, 400D, 500A, or 500D) to detect the presence of an input object 140 at location 610 (illustrated by a dashed circle), sensor module 310 initiates transcapacitive sensing. It should be appreciated that if the method of flowchart 400A is used, then location 610 will only be known in one dimension along axis 261 rather than being known in two dimensions as illustrated.

In one embodiment, determination module 320 determines from an absolute capacitive profile along axis 261 that location 610 is in first portion 621. Based on this determination, sensor module 310 selects a drive order that starts driving sensor electrodes 260 in second portion 622 for the capture of a transcapacitive image frame with sensor electrodes 260 as transmitters and sensor electrodes 270 as receivers. For example, if a sequential drive order is used, the drive order may be, in turn: 260-4, 260-5, 260-6, 260-n, 260-0, 260-1, 260-2, and then 260-3. In another embodiment, the drive order may be: 260-n, 260-6, 260-5, 260-4, 260-3, 260-2, 260-1, and then 260-0. There are many variations which can include driving multiple sensor electrodes 260 at a time, but modulated with different codes. One example of such a drive order where multiple sensor electrodes are simultaneously driven may be, in turn: 260-4 and 260-6, then 260-5 and 260-n, then 260-1 and 260-3, then 260-2 and 260-4.

In one embodiment, determination module 320 determines that location 610 is proximate nearer along axis 261 to sensor electrode 260-0 (at a first end) than to sensor electrode 260-n (at second and opposite end of a sequential ordering of sensor electrodes 260). Based on this determination, sensor module 310 selects a drive order that starts with a sensor electrode that is closer to the second end than to the first end in the sequential ordering. For example, if a sequential drive order is used, the drive order may be, in turn: 260-4, 260-5, 260-6, 260-n, 260-0, 260-1, 260-2, and then 260-3. In another embodiment, the drive order may be: 260-n, 260-6, 260-5, 260-4, 260-3, 260-2, 260-1, and then 260-0. There are many variations which can include driving multiple sensor electrodes 260 at a time but modulated with different codes.

In some embodiments, in particular where large sensor electrode patterns are employed, rather than capturing an entire transcapacitive image frame, only a partial frame may be acquired. In order to give an input object interaction time to develop (e.g., to allow a finger to fully land) prior to the input object location being transcapacitively imaged, sensor module 310 may employ one or more techniques. With reference to the example illustrated in FIG. 6, sensor module 310 may start the scan a time-distance away from location 610 such that the input object interaction is allowed time to progress and further develop. In one embodiment, this may comprise selecting a drive order and start point such that a predefined period of time of time is guaranteed to elapse prior to scanning location 610 according to the selected drive order. For example, if it takes 1 ms to drive on a sensor electrode and then transcapacitively receive on other sensor electrodes, and the predefined time is 2 ms, sensor module 310 would start a sequential scan at least two sensor electrodes away from the sensor 260-1 over which location 610 is fairly centered. In one embodiment, for example, such a drive order that ensures a 2 ms time-distance may be, in turn: 260-n, 260-0, and then 260-1. The drive order may stop with this selected subset of sensor electrodes that encompasses location 610, or may continue on to capture a full transcapacitive image frame in which each sensor electrode 260 is driven for transcapacitive sensing. In another embodiment, for example, such a drive order that ensures a 2 ms time-distance may be, in turn: 260-3, 260-2, and then 260-1. Again, the drive order may stop with this selected subset of sensor electrodes that encompasses location 610, or may continue on to capture a full transcapacitive image frame in which each sensor electrode 260 is driven for transcapacitive sensing.

In some embodiments, other mechanisms such as delay may be introduced to allow an input object interaction with a sensor electrode pattern to further develop. For example, after noting the presence of an input object with absolute capacitive sensing, a delay may be introduced before beginning transcapacitive sensing. The delay is less than the time associated with a full capacitive image frame acquisition, otherwise a transcapacitive image frame could just be acquired and discarded. For example, in one embodiment a sensor electrode pattern may take 8 ms to capture a transcapacitive image frame, but it may take less than that, e.g., 5 ms to allow an input object interaction to further develop after being noted through profile sensing. In such a case, sensor module 310 may introduce a 5 ms delay before driving sensor electrodes 260 in a selected drive order to capture a transcapacitive image frame.

In some embodiments, sensor module 310 may combine one or more of drive order determination, drive order start point, and/or delay in the driving of sensor electrodes 260 to ensure that location 610 is not transcapacitively imaged until the input object interaction has time to further develop while also reducing the overall latency when possible. For example, a short delay may be employed with a selected drive order that starts a certain time-distance away from location 610, with the combination of the delay and the time-distance provided by the drive order allowing time for an input object interaction at location 610 to more fully develop before location 610 is transcapacitively imaged.

In some embodiments, sensor module 310 may also capture a transcapacitive image frame by driving each of the sensor electrodes 270 and receiving resulting signals with sensor electrodes 260. In one such embodiment, where an absolute capacitive profile has been acquired along a second axis, that second absolute capacitive profile may be used to guide an additional transcapacitive sensing frame. For example, because an absolute capacitive profile acquired along axis 271 indicates that location 610 is in fourth portion 632, sensor module 310 selects a drive order that starts driving sensor electrodes 270 in third portion 631 for the capture of a transcapacitive image frame with sensor electrodes 270 as transmitters and sensor electrodes 260 as receivers. For example, if a sequential drive order is used, the drive order may be, in turn: 270-0, 270-1, 270-2, then 260-n. In another embodiment, the drive order may be, in turn: 270-1, 270-0, 270-n, 270-1. As previously discussed, there are many variations which can include driving multiple sensor electrodes 260 at a time, but modulated with different codes.

In the manner previously described, in some embodiments, sensor module 310 may combine one or more of drive order determination, drive order start point, and/or delay in the driving sensor electrodes 270 to ensure that location 610 is not transcapacitively imaged until the input object interaction has time to further develop.

Example Methods of Operation

FIGS. 7A, 7B, and 7C illustrate a flow diagram 700 of a method of capacitive sensing, according to various embodiments. Procedures of this method will be described with reference to elements and/or components of one or more of FIGS. 1-6. It is appreciated that in some embodiments, the procedures may be performed in a different order than described, that some of the described procedures may not be performed, and/or that one or more additional procedures to those described may be performed.

With reference to FIG. 7A, at procedure 710 of flow diagram 700, changes in absolute capacitance are acquired from a first plurality of sensor electrodes of a sensor electrode pattern. A processing system, such as processing system 110A acquires the changes in absolute capacitance. With reference to FIGS. 2, 3, and 6, in some embodiments, sensor module 310 of processing system 110A drives sensor electrodes 260 to acquire an absolute capacitive profile along axis 261. In some embodiments, this comprises driving and sensing with all sensor electrodes 260, while in other embodiments this comprises driving and sensing with only a subset of sensor electrodes 260. For example, in an embodiment where only a subset of sensor electrodes 260 are driven and sensed with, this may comprise every other sensor electrode 260 may be driven and sensed with (e.g., driving and sensing with 260-0, 260-2, 260-4, and 260-6 or driving and sensing with 260-1, 260-3, 260-5, and 260-n).

The measured changes in absolute capacitance indicate that no input object is detected (i.e., there is an absence of any input object in a sensing region associated with a first plurality of sensor electrodes that was used to acquire the changes in absolute capacitance) or that a sensed input is not classified as a valid input object 140. In some embodiments, as illustrated in 430 of FIGS. 4C and 4D, processing system 110A may enter a sleep mode 430 in response to no input object or no valid input object 140 being detected (e.g., at 410 of FIGS. 4C and 4D) and/or may direct entry into a lower that full power sleep mode of an input device 100 or electronic system 150 of which processing system 110A is a part in response to no input object or no valid input object being detected (e.g., at 410 of FIGS. 4C and 4D).

With continued reference to FIG. 7A, at procedure 720 of flow diagram 700, the changes in absolute capacitance are used to determine a drive order in which to drive sensor electrodes of the first plurality of sensor electrodes to acquire changes in transcapacitance between the first plurality of sensor electrodes and a second plurality of sensor electrodes of the sensor electrode pattern. A processing system such as processing system 110A can determine this drive order. With reference to FIGS. 2, 3, and 6, in some embodiments, sensor module 310 of processing system 110A utilizes the absolute capacitive profile of along axis 261 to determine a drive order for sensor electrodes 260 to acquire changes in transcapacitance between sensor electrodes 260 and sensor electrodes 270.

In some embodiments, the changes in absolute capacitance are utilized by determination module 320 to determine that the detected input object is located in a first portion of the sensing region, where the sensing region includes the portion and a non-overlapping second portion. For example, with reference to FIG. 6, determination module 320 determines that an input object is interacting with location 610 in first portion 621 of the sensing region 120 associated with sensor electrode pattern 200. Based on this determination, the drive order for driving sensor electrodes 260 is started from a sensor electrode of the first plurality of sensor electrodes that is located in the second portion of the sensing region. For example, because location 610 is in first portion 621, sensor module 310 causes the drive order to start from one of sensor electrodes 260-4, 260-5, 260-6, and 260-n which are located in the second portion 622 of the sensing region. Likewise, if the location of the input object interaction had been in the second portion 622 of sensing region 120 of sensor electrode pattern 200, then sensor module 310 would cause the drive order to start from one of sensor electrodes 260-0, 260-1, 260-2, and 260-3 which are located in the first portion 621 of the sensing region.

In some embodiments, the changes in absolute capacitance are utilized by determination module 320 to determine that the input object proximate nearer to a first end than to a second end of the first plurality of sensor electrodes, wherein the first end and the second end are opposing ends of a sequential ordering of the first plurality of sensor electrodes. For example, with reference to FIG. 6, determination module 320 determines that an input object is interacting with location 610 which is closer to a first end (sensor electrode 260-0) of the sequential ordering of sensor electrodes 260 that to a second and opposing end (sensor electrode 260-n) in the sequential ordering of sensor electrodes 260. Based on this determination, the drive order for driving sensor electrodes 260 is started from a sensor electrode that is nearer to the second end than to the first end in the sequential ordering of sensor electrodes 260. For example, because location 610 is nearer sensor electrode 260-0 than sensor electrode 260-n, sensor module 310 starts the drive order from one of sensor electrodes 260-4, 260-5, 260-6, and 260-n which are closer to sensor electrode 260-n than to sensor electrode 260-0. Likewise, if the location of the input object interaction had been nearer sensor electrode 260-n than to sensor electrode 260-0, then sensor module 310 would cause the drive order to start from one of sensor electrodes 260-0, 260-1, 260-2, and 260-3 which are closer to sensor electrode 260-0 than to sensor electrode 260-n.

It should be appreciated that in some embodiments, the changes in absolute capacitance are used to select a subset of the first plurality of sensor electrodes to drive for transcapacitive sensing in the drive order. Processing system 110A can choose this subset. For example, and with reference to FIG. 6, may be most efficient to sense only on sensor electrodes 260-1 which is beneath location 610 or perhaps on 260-0, 260-1, and 260-2 to minimally encompass the location 610 in sensing region 120 when performing transcapacitive sensing. However, in some embodiments, processing system 110 chooses a subset of sensor electrodes along with a starting point and drive order such that the starting point is, and drive order are, at least a certain minimum time-distance away from sensor electrode 260-1 which is directly beneath location 610. As has been previously described herein, this is done so that a detected input object 140 can have more time to further develop its interaction with sensing region 120 (e.g., so a finger can more fully land) before it is transcapacitively imaged. This helps prevent detection of a poorly developed input object interaction that may occur by beginning sensing too close to or directly at location 610. Consider an example where a fixed time of 3 ms is allocated to allow an input object interaction to more fully develop. In such an embodiment, if it takes 1 ms to drive a sensor electrode before another sensor electrode can be driven during a sequential transcapacitive scan, then the drive order is selected such that at least three sensor electrodes are driven before sensor electrode 260-1 is driven.

With continued reference to FIG. 7A, at procedure 730 of flow diagram 700, positional information is determined for an input object in a sensing region of the capacitive sensing device based on the changes in transcapacitance. A processing system such as processing system 110A can determine this positional information. In some embodiments, for example, determination module 320 of processing system 110A utilizes the changes in transcapacitance between sensor electrodes 260 and sensor electrodes 270 to determine the positional information of an input object 140 in a sensing region associated with sensor electrode pattern 200.

With reference to FIG. 7B, and procedure 722, in some embodiments, the method as described in 710-730 further comprises acquiring changes in absolute capacitance from the second plurality of sensor electrodes. For example, as described in flowcharts 400B and 500A, absolute capacitive sensing may be performed on a second axis that is orthogonal to the first axis. This may be done as a matter of course in some embodiments (e.g., as shown in FIGS. 5A and 5B), or alternatively may be done only if an input object is detected when acquiring changes in absolute capacitance from the first plurality of electrodes (e.g., as shown in FIGS. 4B and 4D). With reference to FIGS. 2, 3, and 6, this can comprise sensor module 310 of processing system 110A performing acquiring an absolute capacitive profile along axis 271 by performing absolute capacitive sensing with sensor electrodes 270. In some embodiments, this comprises driving and sensing with all sensor electrodes 270, while in other embodiments this comprises driving and sensing with only a subset of sensor electrodes 270. For example, in an embodiment where only a subset of sensor electrodes 270 are driven and sensed with, this may comprise every other sensor electrode 270 may be driven and sensed with (e.g., driving and sensing with 270-0 and 270-2 or driving and sensing with 270-1 and 270-n).

The measured changes in absolute capacitance may indicate that no input object is detected (i.e., there is an absence of any input object in a sensing region associated with a first plurality of sensor electrodes that was used to acquire the changes in absolute capacitance) or that a sensed input is not classified as a valid input object 140. In some embodiments, as illustrated in 430 of FIGS. 4C and 4D and 530 of FIG. 5B, processing system 110A temporarily enters a sleep mode in response to no input object or no valid input object 140 being detected (e.g., at 420 of FIG. 4D or 510 of FIG. 5B) and/or may direct entry into a lower than full power sleep mode of an input device 100 or electronic system of which processing system 110A is a part in response to no input object or no valid input object 140 being detected (e.g., at 420 of FIG. 4D or 510 of FIG. 5B).

With continued reference to FIG. 7B, at procedure 724 the changes in absolute capacitance from the second plurality of sensor electrodes are utilized to determine a second drive order in which to drive sensor electrodes of the second plurality of sensor electrodes to acquire changes in transcapacitance between the second plurality of sensor electrodes and the first plurality of sensor electrodes of the sensor electrode pattern. This occurs when an input object is detected by the measured changes in absolute capacitive sensing. A processing system, such as processing system 110A, can determine this drive order. With reference to FIGS. 2, 3, and 6, in some embodiments, sensor module 310 of processing system 110A utilizes the absolute capacitive profile of along axis 271 to determine a drive order for sensor electrodes 270 to acquire changes in transcapacitance between sensor electrodes 270 and sensor electrodes 260.

It should be appreciated that when performing transcapacitive sensing by driving on sensor electrodes 270, that any of the techniques and procedures described previously herein may be utilized. For example, in addition to the drive order, transcapacitive sensing may not be initiated until after an input object is detected via the absolute capacitive sensing. Further, the initiation of the transcapacitive sensing may be delayed by a predetermined period of time after the absolute capacitive sensing so that the interaction of the input object with sensing region 120 of sensor electrode pattern 200 can more further develop. This delay is less than the time that it would take to drive all of sensor electrodes 270 in the acquisition of a transcapacitive image frame. In the manner previously discussed, the starting location for the drive order can be selected by processing system 110A. For example, if an input object is initially detected in the third portion 631 of sensing region 120 of sensor electrode pattern 200, then the drive order may begin with a sensor electrode 270 that is associated with the fourth portion 632 of sensing region 120. Likewise, if an input object is initially detected to be proximate nearer sensor electrode 270-0 than to sensor electrode 270-0, then drive order may begin with a sensor electrode 270 that is nearer to or is sensor electrode 270-n. As previously described, a sensor module 310 may select a subset of sensor electrodes 270 to drive. Also, as previously described, the drive order may be selected such that it begins at least a minimum time-distance away from the location of the input object as determined by the absolute capacitive sensing.

With reference to FIG. 7C, and procedure 727, in some embodiments, the method as described in 710-730, the acquisition of the changes in transcapacitance described in procedure 720 are only initiated in response to detection of the input object from the changes in absolute capacitance. Flowcharts 400A, 400B, 400C, 400D, 500A, and 500B illustrate some example embodiments of using absolute capacitive sensing to detect the presence of an input object as a trigger to initiate the transcapacitive sensing. Sensor module 310, for example, initiates transcapacitive sensing when determination module determines that an input object 140 is detected by the absolute capacitive sensing performed in procedure 710.

In some embodiments, sensor module 310 delays for a period of time after the acquisition of the changes in absolute capacitance from the first plurality of sensor electrodes and before the initiation of the acquisition of the changes in transcapacitance. The period of time of this delay is less than a transcapacitive image frame acquisition time of the sensor electrode pattern with which the sensing is being performed. As has been described above, a delay between the absolute capacitive sensing and the initiation of the transcapacitive sensing can be used to allow a detected input object (detected through the absolute capacitive sensing) to further develop its interaction with an input device (e.g., this may allow a finger to more fully or completely land). The time period of the delay may be fixed and predetermined.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A processing system comprising:
a sensor module configured to acquire changes in absolute capacitance from a first plurality of sensor electrodes of a sensor electrode pattern, and utilize said changes in absolute capacitance to determine a drive order in which to drive sensor electrodes of said first plurality of sensor electrodes to acquire changes in transcapacitance between said first plurality of sensor electrodes and a second plurality of sensor electrodes of said sensor electrode pattern; and
a determination module configured to determine positional information for an input object in a sensing region of said sensor electrode pattern based on said changes in transcapacitance.

2. The processing system of claim 1, wherein said sensor module is further configured to:
acquire changes in absolute capacitance from said second plurality of sensor electrodes; and
utilize said changes in absolute capacitance from said second plurality of sensor electrodes to determine a second drive order in which to drive sensor electrodes of said second plurality of sensor electrodes to acquire changes in transcapacitance between said second plurality of sensor electrodes and said first plurality of sensor electrodes of said sensor electrode pattern.

3. The processing system of claim 1, wherein said sensor module is further configured to:
initiate said acquisition of said changes in transcapacitance in response to detection of said input object from said changes in absolute capacitance.

4. The processing system of claim 3, wherein said sensor module is further configured to:
delay for a period of time after said acquisition of said changes in absolute capacitance from said first plurality of sensor electrodes and before said initiation of said acquisition of said changes in transcapacitance, wherein said period of time is less than a transcapacitive image frame acquisition time of said sensor electrode pattern.

5. The processing system of claim 1, wherein as part of said drive order determination said sensor module is configured to:
utilize said changes in absolute capacitance to determine that said input object is located in a first portion of said sensing region, said sensing region including said first portion and a non-overlapping second portion; and
start said drive order from a sensor electrode of said first plurality of sensor electrodes that is located in said second portion of the sensing region.

6. The processing system of claim 1, wherein as part of said drive order determination said sensor module is configured to:
utilize said changes in absolute capacitance to determine that said input object is proximate nearer to a first end than to a second end of said first plurality of sensor electrodes, wherein said first end and said second end are opposing ends of a sequential ordering of said first plurality of sensor electrodes; and
start said drive order from a sensor electrode that is nearer to said second end than to said first end in said sequential ordering.

7. The processing system of claim 1, wherein as part of said drive order determination said sensor module is configured to:
utilize said changes in absolute capacitance to select a subset of said first plurality of sensor electrodes to drive for transcapacitive sensing in said drive order.

8. A capacitive sensing input device, said capacitive sensing input device comprising:
a first plurality of sensor electrodes and a second plurality of sensor electrodes; and
a processing system coupled with said first plurality of sensor electrodes and said second plurality of sensor electrodes, said processing system configured to:
acquire changes in absolute capacitance from said first plurality of sensor electrodes of a sensor electrode pattern;
utilize said changes in absolute capacitance to determine a drive order in which to drive sensor electrodes of said first plurality of sensor electrodes to acquire changes in transcapacitance between said first plurality of sensor electrodes and said second plurality of sensor electrodes of said sensor electrode pattern; and determine positional information for an input object in a sensing region of said sensor electrode pattern based on said changes in transcapacitance.

9. The capacitive sensing input device of claim 8, wherein said processing system is further configured to:

direct entry into a sleep mode in response to said changes in changes in absolute capacitance indicating no valid input object being detected in a sensing region of said sensor electrode pattern.

10. The capacitive sensing input device of claim 8, wherein said processing system is further configured to:

acquire changes in absolute capacitance from said second plurality of sensor electrodes; and utilizing said changes in absolute capacitance from said second plurality of sensor electrodes to determine a second drive order in which to drive sensor electrodes of said second plurality of sensor electrodes to acquire changes in transcapacitance between said second plurality of sensor electrodes and said first plurality of sensor electrodes of said sensor electrode pattern.

11. The capacitive sensing input device of claim 8, wherein said processing system is further configured to:

initiate said acquisition of said changes in transcapacitance in response to detection of said input object from said changes in absolute capacitance.

12. The capacitive sensing input device of claim 11, wherein said processing system is further configured to:

delay for a period of time after said acquisition of said changes in absolute capacitance from said first plurality of sensor electrodes and before said initiation of said acquisition of said changes in transcapacitance, wherein said period of time is less than a transcapacitive image frame acquisition time of said sensor electrode pattern.

13. The capacitive sensing input device of claim 8, wherein as part of said drive order determination said processing system is configured to:

utilize said changes in absolute capacitance to determine that said input object is located in a first portion of said sensing region, said sensing region including said first portion and a non-overlapping second portion; and start said drive order from a sensor electrode of said first plurality of sensor electrodes that is located in said second portion of the sensing region.

14. The capacitive sensing input device of claim 8, wherein as part of said drive order determination said processing system is configured to:

utilize said changes in absolute capacitance to determine that said input object is proximate nearer to a first end than to a second end of said first plurality of sensor electrodes, wherein said first end and said second end are opposing ends of a sequential ordering of said first plurality of sensor electrodes; and start said drive order from a sensor electrode that is nearer to said second end than to said first end in said sequential ordering.

15. The capacitive sensing input device of claim 8, wherein as part of said drive order determination said processing system is configured to:

utilize said changes in absolute capacitance to select a subset of said first plurality of sensor electrodes to drive for transcapacitive sensing in said drive order.

16. A method of capacitive sensing, said method comprising:

acquiring, by a processing system, changes in absolute capacitance from a first plurality of sensor electrodes of a sensor electrode pattern;

utilizing, by said processing system, said changes in absolute capacitance to determine a drive order in which to drive sensor electrodes of said first plurality of sensor electrodes to acquire changes in transcapacitance between said first plurality of sensor electrodes and a second plurality of sensor electrodes of said sensor electrode pattern; and determining, by said processing system, positional information for an input object in a sensing region of said sensor electrode pattern based on said changes in transcapacitance.

17. The method as recited in claim 16, further comprising:

acquiring changes in absolute capacitance from said second plurality of sensor electrodes; and utilizing said changes in absolute capacitance from said second plurality of sensor electrodes to determine a second drive order in which to drive sensor electrodes of said second plurality of sensor electrodes to acquire changes in transcapacitance between said second plurality of sensor electrodes and said first plurality of sensor electrodes of said sensor electrode pattern.

18. The method as recited in claim 16, further comprising:

initiating said acquisition of said changes in transcapacitance in response to detection of said input object from said changes in absolute capacitance.

19. The method as recited in claim 18, further comprising:

delaying for a period of time after said acquisition of said changes in absolute capacitance from said first plurality of sensor electrodes and before said initiation of said acquisition of said changes in transcapacitance, wherein said period of time is less than a transcapacitive image frame acquisition time of said sensor electrode pattern.

20. The method as recited in claim 16, wherein said utilizing, by said processing system, said changes in absolute capacitance to determine a drive order comprises:

utilizing said changes in absolute capacitance to determine that said input object is located in a first portion of said sensing region, said sensing region including said first portion and a non-overlapping second portion; and starting said drive order from a sensor electrode of said first plurality of sensor electrodes that is located in said second portion of the sensing region.

21. The method as recited in claim 16, wherein said utilizing, by said processing system, said changes in absolute capacitance to determine a drive order comprises:

utilizing said changes in absolute capacitance to determine that said input object is proximate nearer to a first end than to a second end of said first plurality of sensor electrodes, wherein said first end and said second end are opposing ends of a sequential ordering of said first plurality of sensor electrodes; and starting said drive order from a sensor electrode that is nearer to said second end than to said first end in said sequential ordering.

22. The method as recited in claim 16, wherein said utilizing, by said processing system, said changes in absolute capacitance to determine a drive order comprises:

utilizing said changes in absolute capacitance to select a subset of said first plurality of sensor electrodes to drive for transcapacitive sensing in said drive order.

* * * * *